Aug. 19, 1941.  E. W. WORK  2,253,410
VACUUM BREAKER
Filed Oct. 15, 1938
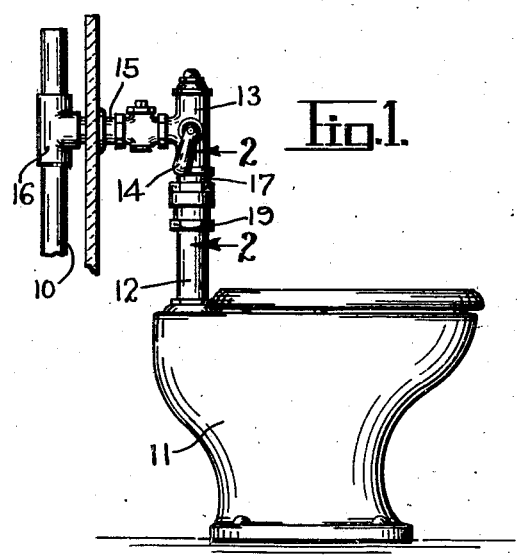
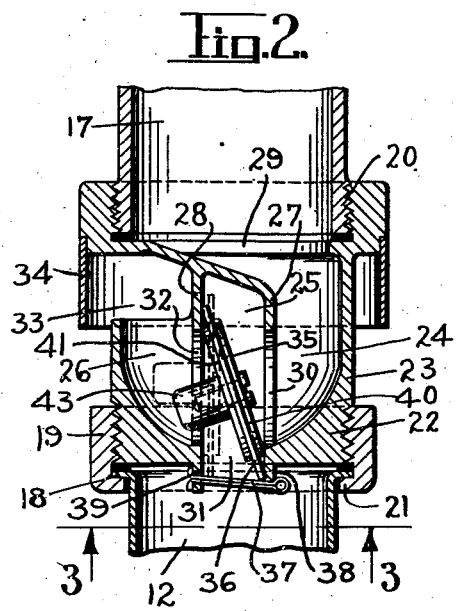
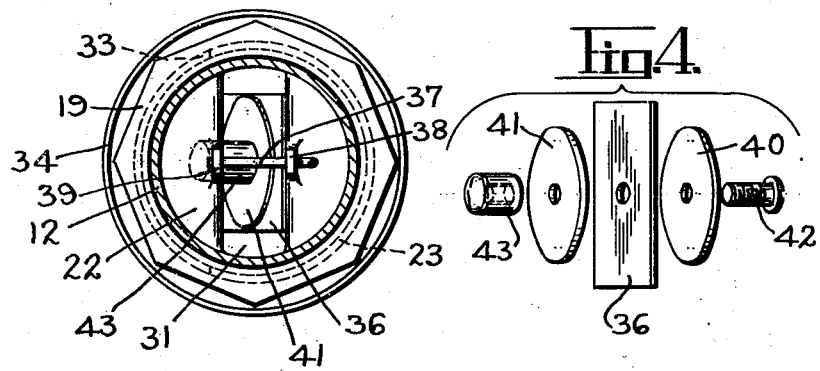
INVENTOR
*Ernest W. Work.*
BY
*H. G. Manning*
ATTORNEY Patented Aug. 19, 1941

2,253,410

UNITED STATES PATENT OFFICE 2,253,410

VACUUM BREAKER

Ernest W. Work, New Britain, Conn., assignor to The Beaton & Cadwell Manufacturing Company, New Britain, Conn., a corporation of Connecticut Application October 15, 1938, Serial No. 235,277

16 Claims. (Cl. 137—69)

This invention relates to plumbing apparatus, and more particularly to an improved vacuum breaker adapted to be included in the pipe connection leading from the flush valve to a sanitary plumbing fixture, such as a water-closet bowl.

This invention is particularly adapted for use with water supply systems wherein the feed line is utilized to furnish water, not only for washing, drinking and cooking, but also for sanitary purposes. It has been found that when a sanitary fixture, such as a water-closet bowl or bath-tub, is connected to the riser pipe of a supply line, grave danger exists that the supply line may become contaminated by the return of liquid from said fixture into the supply whenever vacuum conditions occur in the supply line. This danger is present in almost all houshold and building water supply systems and arises usually when a large flow of water is being taken from other fixtures connected to the same supply line. The vacuum so produced is often sufficient to draw contaminated material from these fixtures back into the supply system, and thus cause the spread of disease, such as typhoid fever.

One object of this invention is to provide an improved vacuum breaker which is adapted to be included as a part of the pipe connection between a flush valve or like fixture and a sanitary plumbing fixture.

A still further object is to provide a vacuum breaking device of the above nature which will not interfere with the flow of water in one direction, but will positively prevent reverse flow of water whenever a vacuum occurs back of the vacuum breaking device, this being accomplished by providing a passage leading to the other atmosphere which destroys any vacuum formed in the fixture or in the system connected therewith.

A still further object is to provide a vacuum breaker of the above nature which will be comparatively simple in construction, inexpensive to manufacture, easy to install, compact, inconspicuous, and very efficient and durable in use.

With these and other objects in view, there has been illustrated in the accompanying drawing, one form in which the invention may be conveniently embodied in practice.

In the drawing:

Fig. 1 is a side elevation of a portion of a water supply system leading to a flush valve connected to control the flow of water to a water-closet bowl, and with the improved vacuum breaker shown installed within the vertical pipe connected to said flush valve.

Fig. 2 is an enlarged longitudinal sectional view of the connecting pipe and vacuum breaker located therein, said view being taken on the line 2—2 of Fig. 1, looking in the direction of the arrows, and showing in full lines the valve member in its normal open position when no water is flowing therethrough, and in dotted lines in the closed position which it occupies when water is flowing through the device.

Fig. 3 is a transverse sectional view, taken on the line 3—3 in Fig. 2.

Fig. 4 is a perspective exploded view of the valve member with its parts shown in separated relationship.

Referring now to the drawing wherein like reference characters denote the same parts throughout the several views, the numeral 10 designates a vertical water supply pipe or riser which is herein shown located behind the wall of a room, and which is adapted to be connected to other fixtures and outlets, both above and below the one illustrated. The plumbing fixture herein shown comprises a water-closet bowl 11 which is connected to the riser pipe 10 by means of a short vertical pipe 12, a flush valve 13 having a control handle 14, a horizontal pipe section 15 and a T-connection 16.

As clearly shown in Figs. 2 and 3, the flush valve 13 has a depending pipe portion 17 which has an enlarged threaded lower end 20. The vertical pipe 12 has a flared upper end 18 for engagement with an inturned flange 21 of a union 19 which is screwed upon a threaded lower end portion 22 of a cylindrical body casing 23 of the vacuum breaker device, comprising the present invention. The upper end of said casing 23 has internal screw threads adapted to screw upon the threaded lower end portion 20 of the pipe portion 17, and as mentioned above, the lower end 22 of said casing 23 is adapted to be clamped by the inturned flange 21 of the union 19 to the short vertical pipe 12.

The casing 23 is provided with a water chamber 24, an intermediate discharge chamber 25, and an air inlet chamber 26, said chambers being separated from each other by partitions 27 and 28. The water chamber 24 is open at its top for connection with the flush valve 13 through an inlet opening 29. The water chamber 24 is also connected with the intermediate chamber 25 by an opening 30 provided in the partition 27. The intermediate chamber 25 has an outlet opening 31 at its bottom where it is connected with the pipe 12. The intermediate chamber 25 is also connected with the air inlet chamber 26 through an opening 32 provided in the partition 28. The air inlet chamber 26 communicates with the outside atmosphere through an air inlet opening 33, preferably arcuate in shape. An annular apron 34 surrounding the casing 23 adjacent the top thereof serves to shield the air inlet opening 33 against the entrance of dust.

A loose valve member 35 is movably disposed in the intermediate chamber 25, and is normally located in the full line position (shown in Fig. 2) for permitting free communication between the water chamber 24 and the intermediate chamber 25 through the opening 30, and also between the intermediate chamber 25, and the air inlet chamber 26 through the opening 32 to maintain the closet bowl 11 in free venting connection with the atmosphere. When the flush valve is operated, the valve member 35 will be forced into the dotted line position to close the opening 32 and prevent the passage of water through the air inlet opening 33.

The valve member 35 includes in its structure, as clearly shown in Fig. 4, an elongated central metallic plate 36, preferably rectangular in form. The plate 36 is adapted to be supported at its lower edge upon a cotter pin 37 which extends between a pair of depending lugs 38 and 39 disposed one on each side of the bottom outlet opening 31 and secured to the lower end of the casing 23. The cotter pin preferably slopes downwardly slightly from the lower end of the partition 28 to the lower end of the partition 27. Discs 40 and 41 of leather or other suitable sealing material and of sufficient area to cover the openings 30 and 32, respectively, are disposed one on each side of the central plate 36 and are clamped thereagainst by means of a headed screw 42 which passes through the plate and both of the discs 40 and 41. The threaded end of said screw 42 is adapted to receive an internally threaded heavy cylindrical plug 43.

*Operation*

In operation, the loose valve member 35 will normally be maintained in full line position shown in Fig. 2 by the action of the weight 43. When the flush valve 13 is opened by manipulation of the handle 14, the flow of water impinging against the rectangular plate 36 will force the valve member 35 into the dotted line position and cause the disc 41 to close and seal the opening 32 in the partition 28 to prevent water from escaping therethrough. The water will then flow from the flush valve 13 into the water chamber 24 through the opening 30 in the partition 27 into the intermediate chamber 25, then through the bottom outlet opening 31 into the short pipe 12, and thence to the closet bowl 11. When the flush valve closes, it will be clear that a partial vacuum will be formed, due to the mild suction action of the last portion of the flushing stream passing to the closet bowl at the side of the plate 36 facing the partition 27, and atmospheric pressure will then act upon the plate 36 to slide the bottom edge thereof along the inclined pin 37 to the right, as viewed in Fig. 2, and the valve member 35 will then assume the full line position shown in Fig. 2. Air will then be permitted to enter the chamber 25 and destroy any vacuum existing either below or above it, thereby preventing any possibility of a back flow from the closet bowl into the water supply pipe 10, which might otherwise occur when water is being drawn from other fixtures and outlets in the supply system. Should a vacuum occur in the supply pipe 10 and continue through the valve 13, the pipe portion 17, and into the chamber 24, the loose "floating" valve member 36 will be pressed by the atmosphere against the opening 30 and the disc 40 will effectively close and seal the same to prevent any possibility of back-siphonage from the closet bowl into the system.

One advantage of the present invention is that it may be readily installed as a part of the existing system without expensive changes.

A further advantage is that the vacuum breaker device will be rendered inconspicuous by being made a part of the connection between the flush valve and the sanitary fixture, thereby avoiding unsightly attachments as in prior vacuum breaking devices.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a vacuum breaker for a liquid system, a cylindrical casing, said casing having three separated chambers provided therein, the first of said chambers being connected to the water supply and to the second chamber, the second chamber being connected at its bottom to an outlet and to a third chamber, said third chamber being open to the atmosphere, and a free shiftable upstanding closure member disposed in said second chamber and being slidably supported at the bottom of said second chamber and adapted to normally permit the flow of water from said first chamber through said second chamber, said closure member being acted upon by the flowing water and moved thereby into a position to close communication to the atmosphere.

2. In a vacuum breaker for a liquid system, a cylindrical casing, said casing including a water chamber connected to a water supply, an intermediate chamber connected to said water chamber and having means at the bottom thereof for connection to an outlet, an air chamber connected to the atmosphere and to the intermediate chamber, said intermediate chamber having valve seats at the points of connection with said water and air chambers and a rockable upstanding thin double-faced valve member disposed in said intermediate chamber and freely movable therein to automatically engage said valve seats and close the connection between said air chamber and said intermediate chamber when water is flowing through said intermediate chamber and to open this connection when the flow of water stops.

3. A vacuum breaker device comprising a casing having a water chamber connected with a water supply, an air chamber connected with the atmosphere, and an intermediate chamber connected to said water chamber and said air chamber and having a bottom outlet, and a rockable valve closure member slidably supported at the bottom of said intermediate chamber adapted to close the connection with said air chamber when water is flowing through said intermediate chamber.

4. A vacuum breaker device comprising a casing having a water chamber connected with a water supply, an air chamber connected with the outside atmosphere, and an intermediate chamber connected to both of said chambers and having a bottom outlet, a pin extending below said outlet, and a common closure member in said intermediate chamber and slidably and pivotally supported on said pin.

5. A vacuum breaker device comprising a casing having a water chamber connected with a water supply, an air chamber connected with the outside atmosphere, and an intermediate chamber having a bottom outlet and having side connections to said air chamber and said water chamber, a valve member in said intermediate chamber, inclined means below said intermediate chamber and above said outlet to support said valve member, said valve member having a weight on one side to unbalance said member and cause the bottom thereof to slide along said support to open said air chamber to the atmosphere upon the occurrence of a small degree of suction.

6. In a vacuum breaker device, a casing having a water chamber connected with a water supply, an air chamber connected with the outside atmosphere, and an intermediate chamber connected with said water chamber and said air chamber, said intermediate chamber having a bottom outlet passage, support means extending across said outlet passage, and a common valve closure member located in said intermediate chamber and slidably and pivotally resting on said support means.

7. A vacuum breaker device comprising a casing having a water chamber connected with a water supply, an air chamber connected with the outside atmosphere, and an intermediate chamber having a bottom outlet and connected at its sides to said air chamber and said water chamber, a relatively thin double-faced valve member in said intermediate chamber, inclined means below said intermediate chamber and above said outlet to support said valve member, said valve member being caused to slide along said support means to open said air chamber to the atmosphere and close said water chamber upon the occurrence of a small degree of suction.

8. In a vacuum breaker device for installation in a water supply system, a cylindrical casing having a water chamber connected with a water supply, an air chamber connected with the outside atmosphere, an intermediate chamber having an outlet opening at its bottom and having transversely alined circular valve seats in its sides leading to said water chamber and said air chamber respectively, and a swingable thin double-faced valve member in said intermediate chamber adapted to seat on said water chamber valve seat when a vacuum occurs in said system and to seat on said air chamber valve seat when water is flowing through said device.

9. In a vacuum breaker device for installation in a water supply system, a water chamber connected with a water supply, an air chamber connected with the outside atmosphere, an intermediate chamber located between and horizontally alined with said water chamber and said air chamber, said intermediate chamber having a bottom outlet opening and transversely alined valve seat openings in its sides leading to said water chamber and said air chamber respectively, and a valve member in said intermediate chamber having means to seat upon and close said air chamber valve seat when water under pressure flows through said device and having means to seat upon and close said water chamber valve seat to prevent back-siphonage from said bottom outlet into said system upon the occurrence of a vacuum therein.

10. In a vacuum breaker device, a cylindrical casing having a water chamber connected with a water supply, an air chamber connected with the outside atmosphere, an outlet chamber located between said water chamber and said air chamber and having an outlet centrally located in said casing, said outlet chamber having annular valve seat openings in its side walls located in horizontal alinement with each other and leading to said water chamber and said air chamber respectively, and a thin double-faced valve member movably mounted in said outlet chamber adapted to seat on said water chamber valve seat opening when a vacuum occurs in said system and to seat on said air chamber valve seat opening when water is flowing through said device.

11. In a vacuum breaker device for installation in a water supply system, a cylindrical casing having a water chamber provided with an upper inlet connected with a water supply, an air chamber connected with the outside atmosphere, an intermediate chamber having a bottom outlet and circular valve openings in its sides leading to said water chamber and said air chamber respectively, and a valve member movably mounted in said intermediate chamber and adapted to seat on said water chamber valve seat when a vacuum occurs in said system, and to seat on said air chamber valve seat when water is flowing through said device, said valve seats being located on opposite sides of the center line of said cylindrical casing.

12. In a vacuum breaker device for installation in a water supply system, a substantially cylindrical casing having a water chamber connected with a water supply, an air chamber connected with the outside atmosphere, an intermediate chamber located between and in substantial horizontal alinement with said water chamber and said air chamber, said intermediate chamber being located substantially at the center of said casing, and having a bottom outlet and valve seat openings in its sides leading to said water chamber and said air chamber respectively, a thin double-faced valve member movably mounted in said intermediate chamber and adapted to seat upon said air chamber valve seat when water from said supply flows through said device and adapted to seat upon said water chamber valve seat upon the occurrence of a vacuum in said device to avoid backsiphonage from said outlet into said system.

13. In a vacuum breaker device for installation in a water supply system, a substantially cylindrical casing having a water chamber connected with a water supply, an air chamber connected with the outside atmosphere, an intermediate chamber located between and in substantial horizontal alinement with said water chamber and said air chamber, said intermediate chamber being located substantially at the center of said casing, and having a bottom outlet and valve seat openings in its sides leading to said water chamber and said air chamber respectively, a thin double-faced valve member movably mounted in said intermediate chamber and adapted to seat upon said air chamber valve seat when water from said supply flows through said device and adapted to seat upon said water chamber valve seat upon the occurrence of a vacuum in said device to avoid backsiphonage from said outlet into said system, the center line of said casing passing substantially through the center of said intermediate chamber.

14. In a vacuum breaker device for installation in a water supply system, a substantially cylindrical casing having a water chamber connected with a water supply, an air chamber connected with the outside atmosphere, an intermediate chamber located between and in substantial horizontal alinement with said water chamber and said air chamber, said intermediate chamber being located substantially at the center of said casing, and having a bottom outlet and valve seat openings in its sides leading to said water chamber and said air chamber respectively, a thin double-faced valve member movably mounted in said intermediate chamber and adapted to seat upon said air chamber valve seat when water from said supply flows through said device and adapted to seat upon said water chamber valve seat upon the occurrence of a vacuum in said device to avoid backsiphonage from said outlet into said system, the central point of the travel of said valve member being located substantially at the center of said casing.

15. In a vacuum breaker device for installation in a water supply system, a substantially cylindrical casing having a water chamber connected with a water supply, an air chamber connected with the outside atmosphere, an intermediate chamber located between and in substantial horizontal alinement with said water chamber and said air chamber, said intermediate chamber being located substantially at the center of said casing, and having a bottom outlet and valve seat openings in its sides leading to said water chamber and said air chamber respectively, a thin double-faced valve member movably mounted in said intermediate chamber and adapted to seat upon said air chamber valve seat when water from said supply flows through said device and adapted to seat upon said water valve seat upon the occurrence of a vacuum in said device to avoid backsiphonage from said outlet into said system, said valve member being parallel to the center line of said casing at one point of its travel between its valve seats.

16. In a vacuum breaker device for installation in a water supply system, a substantially cylindrical casing having a water chamber connected with a water supply, an air chamber connected with the outside atmosphere, an intermediate chamber located between and in substantial horizontal alinement with said water chamber and said air chamber, said intermediate chamber being located substantially at the center of said casing, and having a bottom outlet and valve seat openings in its sides leading to said water chamber and said air chamber respectively, a thin double-faced valve member movably mounted in said intermediate chamber and adapted to seat upon said air chamber valve seat when water from said supply flows through said device and adapted to seat upon said water chamber valve seat upon the occurrence of a vacuum in said device to avoid backsiphonage from said outlet into said system, said valve member passing through the center line of said casing during its travel between its valve seats.

ERNEST W. WORK.